United States Patent [19]

Barrows et al.

[11] Patent Number: 5,736,008
[45] Date of Patent: Apr. 7, 1998

[54] FIBROUS-REINFORCED SHEET

[75] Inventors: William D. Barrows, Manchester; George H. Crouse; John F. Morton, both of Westminster, all of Md.

[73] Assignee: Congoleum Corporation, Mercerville, N.J.

[21] Appl. No.: 45,467

[22] Filed: Apr. 8, 1993

[51] Int. Cl.$^6$ ............................................. D21H 5/18
[52] U.S. Cl. ..................... 162/102; 162/145; 162/146; 162/164.1; 162/168.2; 162/168.3
[58] Field of Search ..................... 162/102, 164.2, 162/168.1, 168.3; 62/145, 164.1, 168.2; 156/156, 145, 146

[56] References Cited

U.S. PATENT DOCUMENTS

| | | |
|---|---|---|
| 3,639,208 | 2/1972 | Varveri et al. . |
| 3,658,474 | 4/1972 | Rothwell . |
| 3,962,332 | 6/1976 | Trapasso . |
| 4,174,279 | 11/1979 | Clark et al. . |
| 4,225,383 | 9/1980 | McReynolds . |
| 4,274,916 | 6/1981 | Grose ........................ 162/145 |
| 4,282,059 | 8/1981 | Davidson . |
| 4,396,513 | 8/1983 | Haldeman . |
| 4,445,970 | 5/1984 | Post et al. . |
| 4,470,877 | 9/1984 | Johnstone et al. . |
| 4,596,661 | 6/1986 | Gill et al. . |
| 4,711,727 | 12/1987 | Matthews et al. . |
| 4,810,329 | 3/1989 | Camisa . |
| 4,892,620 | 1/1990 | Beuzelin et al. . |
| 4,906,386 | 3/1990 | Vasconcellos et al. . |
| 4,913,775 | 4/1990 | Langley et al. . |
| 4,925,530 | 5/1990 | Sinclair et al. ................ 162/164.1 |
| 5,013,456 | 5/1991 | St. John et al. . |
| 5,015,334 | 5/1991 | Derrick ........................ 162/168.1 |
| 5,098,520 | 3/1992 | Begala . |
| 5,126,014 | 6/1992 | Chung . |
| 5,147,507 | 9/1992 | Gill . |
| 5,178,730 | 1/1993 | Bixler et al. . |
| 5,180,473 | 1/1993 | Akune et al. . |
| 5,185,062 | 2/1993 | Bengala . |
| 5,188,888 | 2/1993 | McReynolds . |
| 5,266,164 | 11/1993 | Novak et al. ................ 162/168.2 |

FOREIGN PATENT DOCUMENTS 2185045  7/1987  United Kingdom .

*Primary Examiner*—Richard Weisberger
*Attorney, Agent, or Firm*—Synnestvedt & Lechner

[57] ABSTRACT

A process for forming a highly filled, fibrous-reinforced sheet in which the sheet is formed from an aqueous dispersion of solids which include fibers, filler, and binder and cationic flocculating agent by continuously feeding a stream of such aqueous dispersion onto a moving porous support surface, wherein the filler comprises at least about 50 wt. % of the solids portion of the dispersion, the improvement comprising the use in the aqueous dispersion of a filler consisting essentially of calcium carbonate and a cationic polymeric flocculant having a charge-density of at least about 2 equivalents of cationic nitrogen per kilogram of polymer, and a highly-filled calcium carbonate-containing sheet, and the use of carbon black to impart opacity to paper or sheet that has a white appearance.

31 Claims, No Drawings

FIBROUS-REINFORCED SHEET

FIELD OF THE INVENTION

The present invention relates to a highly filled, fibrous-reinforced sheet and to a process for preparing the sheet. More particularly, the present invention relates to a fibrous-reinforced sheet that is highly filled with calcium carbonate and to a process for preparing the sheet.

Sheets which comprise a relatively small amount of fibers and a relatively high amount of filler are well known. An example of such a sheet comprises cellulosic fibers in an amount of about 5 to about 25 wt. %, about 50 to about 85 wt % of mineral filler such as talc, and about 2 to about 30 wt. % of a binder. Such sheets can be used in a variety of applications, for example, as backing for vinyl floor covering, gasket paper, laminating bases for articles such as, for example, apparel and bookcovers, and laminated and/or compression molded thermoplastic composites, such as, for example, the composite paper-reinforced thermoplastic article described in U.S. Pat. No. 5,188,888. Sheets manufactured for use in such applications generally have a thickness of about 10 to about 500 mils and widths of six to ten feet or more.

The properties required to be present in such sheets vary, depending on the particular application in which the sheet is used. However, in general, the sheet should have the following properties: sufficient tear resistance and sufficient tensile strength to resist being snapped during processing and handling; adequate cohesive strength to resist delamination during processing; flexibility sufficient to enable the sheet to be formed into a roll, and, in the case of use in vinyl flooring, to be coved; resistance to indenting; and dimensional stability as changes in moisture content and temperature are encountered in the environment in which the sheet is used.

Properties such as tensile strength, tear resistance and dimensional stability in the sheet are contributed in the main by the type of fibers present in the sheet. Cohesive properties are in the main contributed by the binder which functions to adhere together the fibers and filler of the sheet. Resistance to indenting is in the main the function of the filler. And flexibility properties are contributed by the fibers, filler, and binder.

The filler is a particularly important constituent of the sheet simply because it comprises such a large proportion of the sheet. To fulfill its function satisfactorily, it must be relatively low in cost, impart desired properties to the sheet, and not offset to any significant degree the properties imparted to the sheet by other of its constituents.

The method which is used most widely to prepare such sheets is the basic method which is used to manufacture paper, including the use of conventional paper-making equipment such as, for example, a Fourdrinier machine. This method includes forming a highly dilute aqueous slurry (for example, 1 wt. % solids) of fibers, filler and other constituents and continuously feeding a stream of such slurry onto a moving horizontal porous conveyor belt. The method includes the use of constituents which are effective in causing the retention of the particulate solids comprising the sheet on the porous belt as water in significant amount drains through the porous belt; means for compacting the wet sheet and removing additional water therefrom; and means for evaporating residual water from the sheet to dry it.

One of the problems that has been encountered in manufacturing a filled, fibrous-reinforced sheet by the aforementioned type of "paper-making" process is the loss of filler through the openings of the porous conveyor belt. Typically, the size of the filler particles is smaller than the openings of the porous belt. Although a certain amount of filler is retained in the wet mass of solids deposited on the belt by virtue of fibers blocking off openings in the porous belt, a significant amount of filler can be carried along by the water which flows through the porous belt. This is, of course, undesirable for several reasons, including the loss of filler from the product.

The present invention is directed to improved means for improving the retention of filler in the sheet during its manufacturing process.

REPORTED DEVELOPMENTS

U.S. Pat. No. 4,225,383 discloses a fibrous-reinforced sheet which is made by a "paper-making" type process and which contains about 50 to about 80 wt. % of filler. This patent discloses that such sheets can be made by including in the aqueous slurry from which the sheet is formed about 2 to about 30 wt. % of a binder which comprises a film-forming, water-insoluble organic polymer in the form of an ionically stabilized latex having no greater than 0.7 milliequivalent of bound charge per gram of polymer in the latex. Such polymers include anionic polymers, that is, polymers which carry a negative charge by virtue of their containing ionizable groups such as carboxylate groups. This patent discloses also the use in the slurry of a flocculating agent which has a charge opposite that of the latex. Accordingly, a cationic flocculant, that is, a flocculant bearing a positive charge is suggested for use in combination with an anionic polymer.

The aforementioned '383 patent discloses the use of a variety of fillers in preparing the highly filled sheets described therein, including, for example, magnesium hydroxide, magnesium silicate, magnesium carbonate, talc, zinc oxide, calcium sulfate, calcium carbonate and others. Developmental work has shown that it is feasible to prepare, according to the disclosure of the '383 patent, highly filled sheets utilizing a filler such as raw talc (about 50 wt. % magnesite and about 50% talc). (Raw talc is a filler which is used widely in manufacturing sheets which are used, for example, as backing for vinyl floor covering.) However, developmental work has shown also that it is not possible to make effectively a highly filled sheet (for example, about 80 wt. % filler) when the filler is calcium carbonate. Experience has shown that critical amounts of calcium carbonate are not retained with the other ingredients which make up the sheet and are carried away with the water constituent of the slurry as it flows through the porous belt on which the slurry is deposited. It is a significant disadvantage that calcium carbonate cannot be used as the filler in highly filled sheets because it is about one third the cost of raw talc. The present invention relates to the provision of a fibrous-reinforced, highly filled sheet which includes a filler that consists essentially of calcium carbonate.

SUMMARY OF THE INVENTION

In accordance with the present invention, there is provided, in a process for forming a highly filled, fibrous-reinforced sheet in which the sheet is formed from an aqueous dispersion of solids which include fibers, filler, and binder and cationic flocculating agent by continuously feeding a stream of such aqueous dispersion onto a moving porous support surface, wherein the filler comprises at least about 50 wt. % of the solids portion of the dispersion, the improvement comprising the use in the aqueous dispersion of a filler consisting essentially of calcium carbonate and a cationic polymeric flocculant having a charge-density of at least about 2 equivalents of cationic nitrogen per kilogram of polymer.

In preferred form, the cationic flocculant is a copolymer of acrylamide and cationic acrylate ester of essentially linear polymer structure with a weight average molecular weight of at least about 5 million.

Another aspect of the present invention encompasses the provision of a fibrous-reinforced sheet comprising:

(A) about 5 to about 25 wt. % fibers;

(B) at least about 50 wt. % calcium carbonate filler;

(C) about 2 to about 30 wt. % of resin binder; and (D) about 0.01 to about 0.5 wt. % of a cationic polymeric flocculant having a charge-density of at least about 2, preferably at least about 3.5, equivalents of cationic nitrogen per kilogram of polymer.

In preferred form, the sheet comprises at least about 70 wt. % calcium carbonate, most preferably about 75 to about 85 wt. % calcium carbonate. Also in preferred form, the aforementioned sheet has a tensile strength of at least about 20 pounds per inch width, more preferably at least about 40 pounds per inch width.

An additional aspect of this invention is related to a method for imparting opacity to white paper or a white, highly filled, fibrous-reinforced sheet that includes a filler, for example, calcium carbonate, and that is prepared from a dilute aqueous dispersion of fibers and filler comprising including in the dispersion carbon black in an amount sufficient to render the paper or sheet opaque and to retain the white appearance of the sheet or paper. In addition, the present invention includes within its scope the provision of white paper or white, highly filled, fibrous-reinforced sheet that tends to lack opacity in which there is included in the sheet a sufficient amount of carbon black to impart opacity to the white paper or sheet and to retain the white appearance of the sheet or paper.

There are numerous advantages which are provided by the present invention. It permits a manufacturer to utilize, in relatively large quantities, calcium carbonate, which is one of the lower cost filler materials available to the industry. The invention permits this to be done in a way which utilizes available equipment which can be operated according to processing conditions which have come to be standards in the industry. Thus, it is not necessary to invest in equipment or make processing changes in adopting the use of the present invention. In addition, the highly filled, calcium carbonate-containing sheet of the present invention has properties which meet accepted standards. The invention provides also economic and effective means for imparting opacity to paper or a highly filled, fibrous-reinforced sheet in a manner such that the white color thereof is substantially retained.

DETAILED DESCRIPTION OF THE INVENTION

The classes of constituents comprising the sheet of the present invention are known. They include fibers, filler, binder and cationic polymeric flocculant having a charge-density of at least about 2 equivalents of cationic nitrogen per kilogram of polymer (also referred to herein as "high charge-density flocculant").

The fibers impart strength and other properties to the sheet. They are water-insoluble and are capable of being dispersed in the aqueous medium which functions as the liquid carrier of the various constituents from which the sheet is formed. The fibers can be natural or synthetic materials. Two or more different kinds of fiber can be used to prepare the sheet. Examples of such fibers are cellulosic fibers, glass fibers, including, for example, chopped glass, blown glass, and spun glass fibers and rock wool fibers, ceramic fibers, and synthetic resinous fibers, for example, polyester, polyethylene, polypropylene, and nylon fibers. The sheet of the present invention can be made effectively without the use of asbestos fibers which are associated with health hazards.

It is preferred to use a mixture of cellulosic and glass fibers, the latter functioning to impart good dimensional stability to the sheet. The cellulosic fibers can be, for example, cellulosic pulp fibers, either virgin or secondary (recycled), and either bleached or unbleached. Such cellulosic fibers can be produced, for example, by any suitable chemical or chemi-mechanical pulp-making process. The glass fibers are preferably chopped glass fibers which are sized for water dispersibility, for example, with a polyester coating.

Any suitable form of calcium carbonate can be used as filler for the purpose of imparting desired properties to the sheet and reducing its cost. Various forms of calcium carbonate are known, for example, as described in U.S. Pat. No. 4,596,661. It is believed that the most widely used source of the calcium carbonate will be limestone rock which is crushed and ground to suitable particle size, for example, by roller milling. However, the source of calcium carbonate can also be other naturally occurring calcium carbonate or precipitated calcium carbonate.

The calcium carbonate can be of any suitable particle size. In general, the particle size of the calcium carbonate will fall within the range of about 1 to about 30 microns in equivalent spherical diameter. Ball-milling of limestone can be used to produce calcium carbonate which has a relatively high content of fine particles, that is, <3 microns, which is desirable for imparting opacity to the sheet. There has been used to good advantage dry ground limestone having the following particle size distribution: 0 wt. % —>100 microns; 15 wt. % to 35 wt. % —<100 microns, but >15 microns; 50 wt. % —<7 to 15 microns; and 15 to 35 wt. % —<3 microns.

Excellent results have been achieved utilizing calcium carbonate as the only filler in the sheet. However, one or more other fillers can be used in combination with calcium carbonate. When another filler(s) is used, it is recommended that it comprise about 1 to about 10 wt. % of the solids content of the aqueous dispersion. Typically, the filler is a particulate material which is essentially water-insoluble. Examples of other fillers that can be used are clay, magnesium hydroxide, magnesium carbonate, titanium dioxide, zinc oxide, barium sulfate, calcium sulfate, amorphous silica, aluminum silicate, magnesium silicate, diatamaceous earth, aluminum trihydrate, talc, and vermiculite.

The binder functions to adhere together the various constituents of the sheet and to impart cohesive and other desired properties thereto. The binder typically comprises water-insoluble, solid resin particles which are dispersed in the slurry and which are film-forming in nature, for example, the types of resin solids used in water-based paints. The most convenient source of the binder is a latex, that is, an aqueous dispersion of resin solids having a size which is colloidal in nature.

For use in the present invention, the resin should be anionic, that is, carry a negative charge. Any available means can be used to formulate a negatively charged resin or to impart to the resin a negative charge. In preferred form, the resin is prepared from a monomer or mixture of monomers, at least one of which includes an ionizable group, for example, a negatively charged carboxylate, sulfate or sulfonate group. Exemplary of the nature of the charge carried by the resin is about 0.03 to about 0.7 milliequivalents of charge per gram of resin in a latex thereof.

It is believed that anionic resins that will be used most widely as the binder in the present invention will comprise a polymer (a homopolymer or higher polymer) prepared from one or more monomers which include ethylenic unsaturation. Examples of suitable polymers include styrene-butadiene resins, acrylate resins, ethylene-vinyl acetate resins, acrylonitrile resins, acrylonitrile-butadiene-styrene resins, poly(vinyl chloride) resins, and poly(vinylidene chloride) resins. The preferred binder is a carboxylated styrene-butadiene resin supplied in the form of a latex.

As required, there should be included in the slurry a coagulant which functions to impart to the fibers and fillers positive charges which anchor these materials to the negatively charged sites of the anionic resin binder. Examples of coagulants that can be used are water-soluble inorganic salts such as aluminum sulfate (alum), calcium chloride, and magnesium chloride and water soluble, cationic resins, for example, low molecular weight quaternized amines, low molecular weight polyacrylamides, and low molecular weight polyethylene imine. The low molecular weight polyacrylamide resin can function also to improve the wet-strength properties of the sheet, as, for example, resins of the type that impart permanent strength to a sheet. It is preferred to use a mixture of coagulants comprising an inorganic bi- or tri-valent metal salt, for example, alum, and a polymeric coagulant, for example, a conventional cationic polyacrylamide wet-strength resin.

A slurry which includes the aforementioned type coagulant is not capable of being formed into the highly-filled sheet which is the subject of the present invention. There is insufficient retention of the coagulated particles on the porous support on which the slurry is deposited. In addition, the nature of the coagulated particles that are formed is such that they interfere with the drainage of the water through the porous support. When this occurs, it is necessary to slow down the speed of the moving support in order to permit the drainage of additional water. This is disadvantageous because it slows the rate of production.

The high charge-density cationic flocculant used in the practice of the present invention functions to form the coagulated particles of the slurry into soft flocs. In certain embodiments within the scope of the present invention, the flocs have been observed to be similar in structure and in size to snowflakes. The flocs are in effect discrete clumps which are of larger size than the coagulated particles and sufficiently large to resist passing through the openings of the porous support surface on which they are retained. Also, the nature of the flocs is such that water of the slurry drains freely and quickly through the openings of the support surface and at a rate such that normal operating speeds of the moving porous support surface can be maintained.

As mentioned above, the cationic flocculant for use in the practice of the present invention has a charge-density of at least about 2 equivalents of cationic nitrogen per kilogram of polymer. It is believed that the flocculants used most widely will have a charge-density within the range of about 2 to about 5 or 5.2 of the aforementioned equivalents. In preferred form, the charge-density is at least about 3.5 equivalents of cationic nitrogen per kilogram of polymer. Cationic resins or polymers which have such charge-densities are known, for example, as described in U.S. Pat. Nos. 5,098,520 and 5,178,730.

Such a polymer can be prepared, for example, by the polymerization of an ethylenically unsaturated cationic monomer or monomers, with or without another monomer or monomers (typically nonionic) utilizing amounts of monomers such that the resulting polymer has the desired charge-density. Examples of cationic monomers that can be used to prepare high charge-density cationic polymers are: dialkyl amino alkyl acrylates or methacrylates or acrylamides or methacrylamides in acid salt form, or preferably in the form of a quaternary ammonium salt. An example of a monomer that can be polymerized with the cationic monomer is an acrylamide. Examples of cationic polymers include quaternized and unquaternized copolymers of dimethylamino ethyl acrylate or methacrylate and acrylamide, polyethylene imines, polyamine epichlorohydrin polymers and homo- and co-polymers (with acrylamide) of dialyldimethylammonium chloride.

Other patents which refer to cationic polymers having a high charge-density include: U.S. Pat. Nos. 3,658,474; 3,962,332; 4,174,279; 4,396,513; and 4,711,727. Various of these patents disclose different bases for the charge-densities of the cationic polymers described therein. For example, aforementioned U.S. Pat. No. 4,396,513 discloses a charge-density based on the molar ratio of the cationic monomer used to prepare the polymer. For example, a polymer made from 80 to 90 mole % of a cationic monomer is considered to have a charge-density of 80 to 90%, which is referred to as a very high charge-density. Cationic polymers disclosed in this patent include those prepared by polymerizing a quaternary ammonium salt of 2-(meth)acryloyloxyethyl-N, N-dimethylamine with acrylamide.

Examples of commercially available high charge-density cationic flocculants that can be used in the practice of the present invention are described hereafter. WT-2476I, which is sold by Calgon Corporation, is a high molecular weight cationic polyelectrolyte in the form of a latex of cationic polymer that has a charge-density of about 2 to about 5.2 equivalents of cationic nitrogen per kilogram of polymer. The latex is an opaque white liquid having a density of 8.6 lbs./gallon and a viscosity of about 1500–3500 cps. This cationic polymer is described by its manufacturer as being effective for use in various liquid/solids separating processes such as sludge thickening, clarification, floatation, vacuum filtration and centrifugation. (It is believed that this polymer is the equivalent of Calgon's Hydraid CMP-452 which is described as being effective for use in liquid/solids separations involving paper machine retention, clarification, paper machine drainage, and save-all applications.) Optimer 7194 and Optimer 7195, which are sold by Nalco Chemical Company, are described as high charge and high molecular weight cationic flocculants which are in latex form. These cationic flocculants are described as being effective for use in various types of dewatering processes. They have a charge density of about 2 to about 5 equivalents of cationic nitrogen per kilogram of polymer.

Although various of the high charge-density cationic flocculants are available commercially in the form of latexes (colloidal dispersions of resin solids), the flocculants can be treated according to known procedures to solubilize them, as recommended by their suppliers. Thus, the flocculants can be added to the slurry in solution form.

The art recognizes the use in aqueous slurries of the type involved herein of other ingredients which are typically used in small amounts and which can be considered as additives or optional ingredients. Examples of such materials include antioxidants, anionic or cationic mildewcides, and defoaming agents.

The aqueous slurry used in making the sheet of the present invention can be formulated from ingredients that are used in amounts which are known in the art. The aqueous slurry contains a very high proportion of water and a relatively small amount of materials which are dissolved therein or which are dispersed therein as solid particles (both dissolved materials and solid particles are encompassed by the use herein of the term "solids content"). Typically, the solids content of the slurry will comprise about 0.5 to about 15 wt. % of the slurry, based on the total weight of the water and the solids content of the slurry. For the purpose of manufacturing a sheet for use as a backing for vinyl floor covering, it is recommended that it be formed from a slurry that has a solids content of about 3 to about 6 wt. %.

The proportion of constituents comprising the solids content of the slurry will generally comprise: (A) about 5 to about 25 wt. % of fibers; (B) at least about 50 wt. % of calcium carbonate; (C) about 2 to about 30 wt. % of binder; (D) 0 to about 2 wt. % of a coagulant; and (E) about 0.01 to about 0.5 wt. % of a high charge-density cationic flocculant. When present, an additive will generally comprise about 0.001 to about 1 wt. % of the slurry. In the manufacture of a sheet for use as a backing for vinyl floor covering, it is preferred that the solids content of the slurry comprises: (A) about 5 to about 15 wt. % of fibers; (B) at least about 70 wt. %, preferably about 75 to about 85 wt. %, of calcium carbonate; (C) about 5 to about 15 wt. % of binder; (D) about 0.1 to about 2 wt. % of a coagulant; and (E) about 0.01 to about 0.1 wt. % of a high charge-density cationic flocculant. In preferred form, the slurry will include also about 0.05 to about 0.5 wt. % of an antioxidant.

The pH of the slurry should be such that the calcium carbonate is not degraded. For this purpose, the pH should be at least about 7.0, and is typically in the range of about 7.5 to about 8.5.

By virtue of the excellent retention of solid contents of the slurry on the porous support surface that is achieved by the use of the present invention, the proportion of ingredients comprising the highly filled sheet will correspond closely to the proportion of solid contents of the slurry. Thus, the sheet will generally comprise: (A) about 5 to about 25 wt. % of fibers; (B) at least about 50 wt. % of calcium carbonate; (C) about 2 to about 30 wt. % of binder; (D) 0 to about 2 wt. % of coagulant; and (E) about 0.01 to about 0.5 wt. % of a high charge-density cationic flocculant. For a sheet that is used as a backing for vinyl floor covering, it is preferred that it comprise (A) about 5 to about 15 wt. % of fibers; (B) at least about 70 wt. %, preferably about 75 to about 85 wt. %, of calcium carbonate; (C) about 5 to about 15 wt. % of binder; (D) about 0.1 to about 1 wt. % of coagulant; and (E) about 0.01 to about 0.1 wt. % of a high charge-density cationic flocculant.

Sheet parameters such as density and thickness will tend to vary within relatively broad ranges depending on the particular application in which the sheet is used. For example, the density and thickness of the sheet can be respectively about 30 to about 120 lbs/cu ft, and about 10 to about 500 mils. For use as backing for vinyl floor covering, it is preferred that the density be about 50 to about 90 lbs/cu ft and that the thickness be about 15 to about 40 mils.

One of the features of the present invention is the provision of a highly-filled calcium carbonate sheet that has a combination of excellent properties. For example, the present invention can be used to form sheets that have a tensile strength of at least about 20 lbs (1"-wide strip, evaluated at 74° F.), and at least about 5 lbs (1"-wide strip, measured at 350° F.). Sheets with such strength characteristics are particularly useful as backings for vinyl floor covering.

As described above, the sheet of the present invention can be made by any suitable process which involves forming the sheet from a highly dilute aqueous slurry of constituents comprising the sheet. Examples of suitable processes are referred to in aforementioned U.S. Pat. No. 4,225,383.

As mentioned above, one of the advantages of the present invention is that standard processing steps do not have to be changed in an adverse way to accommodate the use of the invention. In this regard, it is noted that line speeds of the type generally used in the manufacturing process can be maintained or even increased. For example, in the manufacture of a backing for vinyl floor covering, the porous support surface can be operated at a speed of at least about 100 feet/minute, and preferably is operated at a speed of at least about 200 feet per minute.

An exemplary sequence of process steps for forming the aqueous slurry is described hereafter. Calcium carbonate is added with agitation to water which preferably has been heated to a temperature of about 90° to about 110° F. Thereafter, there can be added, in sequence, coagulant, fibers, and optionally, a polyacrylamide resin or equivalent material which functions to improve the wet strength of the sheet and as a coagulant, and an antioxidant, when used. Additional water is added with agitation to the slurry to reduce the solids content thereof to, for example, about 3 to about 7 wt. %. Thereafter, the binder, preferably in the form of a latex, is added to the dilute slurry. The dilution facilitates a thorough blending of the binder with the fiber/filler constituents. There is then added to the slurry, with agitation, the high charge-density cationic flocculant.

EXAMPLES

Examples below are illustrative of the practice of the present invention. Comparative examples are set forth also.

Table 1 below includes a description of four aqueous slurries, one of which can be used to form a highly filled sheet which is an exemplary embodiment of the present invention (Example 1) and the others of which are comparative in that they include talc as the filler instead of calcium carbonate (Examples C-2 and C-3) or they include a prior art cationic flocculant (Examples C-1, C-2 and C-3).

TABLE 1

| Ingredients | Amount of Ingredients, wt. %, except water, as indicated | | | |
|---|---|---|---|---|
| | Ex. C-1 | Ex. C-2 | Ex. C-3 | Ex. 1 |
| water (ml) | 5000 | 5000 | 5000 | 5000 |
| talc (filler) | — | 79.7 | 80.04 | — |
| $CaCO_3$ (filler) | 79.73 | — | — | 80.04 |
| alum (coagulant) | 0.5 | 0.5 | 0.1 | 0.1 |
| cellulosic fibers | 7.4 | 7.4 | 7.4 | 7.4 |
| glass fibers | 1.00 | 1.00 | 1.00 | 1.00 |
| polyacrylamide (coagulant) | 0.19 | 0.19 | 0.19 | 0.19 |
| antioxidant | 0.15 | 0.15 | 0.15 | 0.15 |
| styrene-butadiene resin (binder) | 10.99 | 11.00 | 11.00 | 11.00 |

TABLE 1-continued

| | Amount of Ingredients, wt. %, except water, as indicated | | | |
|---|---|---|---|---|
| Ingredients | Ex. C-1 | Ex. C-2 | Ex. C-3 | Ex. 1 |
| prior art flocculant | 0.05 | 0.13 | 0.13 | — |
| high charge-density cationic flocculant | — | — | — | .08 |

The talc used in the slurries of Examples C-2 and C-3 was sold by Cypress Industrial Minerals as Vertal 8. The calcium carbonate used in the slurries of Examples C-1 and 1 was roller-milled limestone. The cellulosic fiber consisted of northern bleached softwood kraft. The polyacrylamide coagulant is sold as Kymene 557H by Hercules Incorporated. The glass fibers had a diameter of 7.5 µ and length of ⅛". The anti-oxidant is a 50% solids aqueous emulsion of 50% of a hindered bis-phenol and 50% of high molecular weight thioester. The styrene-butadiene resin is carboxylated and was added in the form of a latex sold by Dow Chemical Company. The prior art flocculant consisted of a medium molecular weight cationic polyacrylamide emulsion flocculant sold by Calgon Corporation as Hydraid TRP948. The high charge-density cationic flocculant was Hydraid CMP-452 sold by Calgon Corporation.

Each of the aqueous slurries described in Table 1 above was formed into a sheet by adding the required aliquot of slurry to a Williams Standard Sheet Mold, pressing the formed sheet between standard blotting paper using a Williams Oil Hydraulic Press, and drying against a heated drum dryer. Thereafter, various properties of the sheets and process conditions associated with the making of the sheets were evaluated. Table 2 below includes the results of the evaluations.

TABLE 2

| Properties/ Processing Conditions | Values of Properties/Processing Conditions of Sheets formed from Slurries of | | | |
|---|---|---|---|---|
| | Ex. C-1 | Ex. C-2 | Ex. C-3 | Ex. 1 |
| sample guage | .024" | .024" | .0235" | .0235" |
| ream weight (480 sq ft basis) | 65.17 | 64.69 | 66.24 | 66.24 |
| density (#/cf) | 69.25 | 68.87 | 70.42 | 70.42 |
| tensile, 1"-wide strip @ 74° F. (#) | 27 | 24 | 27 | 29 |
| elongation at 74° F. (%) | 4.8 | 4.8 | 5 | 4 |
| tensile, 1"-wide strip @ 350° F. (#) | 10 | 10 | 12 | 11 |
| elongation at 350° F. (%) | 3 | 4 | 3 | 3 |
| plasticized tensile (#) | 11 | 8 | 9 | 12 |
| wet tensile, 1"-wide strip, 30 seconds (#) | 10 | 8 | 11 | 13 |
| mullen (psi) | 48 | 43 | 49 | 59 |
| elmendorf tear (grams-force) | 118 | 150 | 160 | 160 |
| stiffness | 48 | 52 | 60 | 52 |
| plasticized stiffness | 16 | 20 | 16 | 16 |

TABLE 2-continued

| Properties/ Processing Conditions | Values of Properties/Processing Conditions of Sheets formed from Slurries of | | | |
|---|---|---|---|---|
| | Ex. C-1 | Ex. C-2 | Ex. C-3 | Ex. 1 |
| Williams freeness, 80 mesh screen (wt. % loss) | 2.4 | 1.06 | 1.89 | 1.45 |
| Williams freeness (seconds) | 11 | 9 | 11 | 10 |

Attention is directed to Table 2 above in respect of the wt. % loss values recorded for non-aqueous constituents of the slurry passing through the 80 mesh screen. The value of 2.4 wt. % recorded for the slurry of Example C-1 is considered to be unsatisfactory for the effective manufacture of sheet on an industrial scale. However, the 1.45 wt. % loss value for the slurry of Example 1 is considered to be satisfactory, and, as can be seen from other values in Table 2, the slurry of Example 1 is capable of being formed into a sheet which has comparable or better properties than sheets formed from the comparative slurries.

The effectiveness of the present invention has been demonstrated also in other ways. For example, sample stock, which normally would be used in the Williams Sheet Mold, is exposed to a very high level of shear in a jar with a 1300 rpm agitator for 60 seconds. This duplicates the high shear which actually occurs as slurry is pumped onto the moving porous support surface. With limestone and Hydraid TRP-948 flocculant (prior art), freeness (drainage) increases from about 10 seconds to about 35 seconds (unacceptably slow drainage) and % weight loss increases from about 1.5% to about 15% (totally unacceptable). Using the improved flocculant of this invention, freeness (drainage) increases from 10 seconds (unsheared) to only 15–25 seconds (acceptable) and % weight loss increases from about 1.5% to 5–9% (acceptable). Therefore, the improved flocculants are much more resistant to shear (of the slurry) than the prior art flocculants.

As mentioned hereinabove, another aspect of the present invention relates to the use of carbon black to impart opacity to either paper or to a highly-filled, fibrous-reinforced sheet that is white in color, but tends to lack opacity, that is, for example, translucent. Opacity in paper or the aforementioned type sheets is a desired characteristic for many applications in which the paper or sheet is used. For example, with paper, opacity is a desired property when the application involves printing the paper on both sides. In the use of fibrous-reinforced sheet as backing for vinyl floor covering, it is not aesthetically desirable to have the backing appear transparent; opacity is desired.

Developmental work has revealed that the use of carbon black in relatively small quantities provides significant increases in opacity with but minor degradation in the white appearance of white paper or white fibrous-reinforced sheets. Both paper and sheets of the aforementioned type have in common their being comprised of fibers and filler. Typically, the filler component of paper comprises about 5 to about 35 wt. % of the paper. The filler component of highly-filled fibrous reinforced sheets, on the other hand, comprises a higher proportion of the sheet, for example, at least about 50 wt. %. The use of carbon black is effective for the purpose described herein in connection with both paper and sheet-type products, and also with products that comprise a filler other than calcium carbonate.

The amount of carbon black used for its "opacity" application will tend to vary depending on various parameters including, for example, the thickness of the paper or sheet, the proportion of ingredients comprising the paper or sheet, and the whiteness of the paper or sheet. It is recommended that there be used about 0.0001 to about 0.05 wt. % of the carbon black in the paper or sheet, based on the total weight of the ingredients comprising the paper or sheet, and that adjustments in amounts be made as needed for the specific application. In the manufacture of sheet of the type used as backing for vinyl floor covering, it is recommended that the carbon black comprise about 0.001 to about 0.05 wt. %, more preferably about 0.001 to about 0.01 wt. % of the sheet. The retention characteristics of the carbon black are excellent in that it is well retained with other ingredients comprising the sheet or paper on the moving porous support surface during manufacture of the product. Accordingly, the proportion of carbon black comprising the solids content of the aqueous dispersion used to make the paper or sheet can correspond to the proportion of carbon black comprising the finished paper or sheet.

There is set forth in Table 3 below the identity of aqueous dispersions which include carbon black therein (Examples 2 and 3) and a comparative dispersion which does not include carbon black (Example C-4). The dispersions described in Table 3 were formed into white sheets in the basic manner described hereinabove in connection with previous examples.

TABLE 3

| Ingredients | Amount of Ingredients, wt. %, except water, as indicated | | |
|---|---|---|---|
| | Ex. C-4 | Ex. 2 | Ex. 3 |
| water (ml) | 5000 | 5000 | 5000 |
| talc (filler) | 80.04 | — | — |
| CaCO$_3$ (filler) | — | 80 | 80 |
| alum (coagulant) | 0.1 | 0.15 | 0.15 |
| cellulosic fibers | 7.4 | 7.4 | 7.4 |
| glass fibers | 1 | 1 | 1 |
| polyacrylamide (coagulant) | 0.19 | 0.19 | 0.19 |
| carbon black | — | 0.005 | 0.0025 |
| antioxidant | 0.15 | 0.15 | 0.15 |
| styrene-butadiene resin (binder) | 11 | 11 | 11 |
| prior art flocculant | 0.14 | — | — |
| high charge-density cationic flocculant | — | 0.14 | 0.14 |

The opacities of samples of sheets formed from the aqueous dispersions described in Table 3 were evaluated by placing a hand between the back side of the sheet and a ceiling light, and examining the front side of the sheet with the eye. The sheet made from the dispersion of Example C-4 was translucent in that there could be distinctly seen through the sheet the shadow of the hand and fingers thereof. In contrast, nothing could be seen through the sheet made from the dispersion of Example 2, and the shadow of the hand could be barely seen through the sheet made from the dispersion of Example 3.

In summary, it can be said that the present invention provides practical means for improving in significant ways the manufacture of products of the type described above.

We claim:

1. In a process for forming a highly filled, fibrous-reinforced sheet in which the sheet is formed from an aqueous dispersion of solids, including fibers, filler, and binder and cationic flocculating agent by continuously feeding a stream of such aqueous dispersion onto a moving porous support surface, wherein the filler comprises at least about 50 wt. % of the solids content of the dispersion, the improvement comprising forming a highly filled, fibrous-reinforced sheet comprising at least about 50 wt. % calcium carbonate filler by the use in the aqueous dispersion of: (a) a filler comprising at least about 50 wt. % of calcium carbonate; (b) a cationic polymeric flocculant having a charge-density of at least about 2 equivalents of cationic nitrogen per kilogram of polymer; and (c) said binder comprising an anionic polymer binder.

2. A process according to claim 1 wherein the solids content of the aqueous dispersion comprises about 0.5 to about 15 wt. % of the aqueous dispersion.

3. A process according to claim 2 wherein the solids content of the aqueous dispersion comprises about 3 to about 6 wt. % of the aqueous dispersion.

4. A process according to claim 2 wherein the solids content of the aqueous dispersion comprises (A) about 5 to about 25 wt. % of fibers; (B) at least about 50 wt. % of calcium carbonate; (C) about 2 to about 30 wt. % of binder; (D) 0 to about 2 wt. % of a coagulant; and (E) about 0.01 to about 0.5 wt. % of flocculant.

5. A process according to claim 2 wherein the solids content of the aqueous dispersion comprises (A) about 5 to about 15 wt. % of fibers; (B) at least about 70 wt. % of calcium carbonate; (C) about 5 to about 15 wt. % of binder; (D) about 0.1 to about 2 wt. % of a coagulant; and (E) about 0.01 to about 0.1 wt. % of flocculant.

6. A process according to claim 3 wherein the solids content of the aqueous dispersion comprises (A) about 5 to about 15 wt. % of fibers; (B) about 75 to about 85 wt. % of calcium carbonate; (C) about 5 to about 15 wt. % of binder; (D) about 0.1 to about 2 wt. % of a coagulant; and (E) about 0.01 to about 0.1 wt. % of flocculant.

7. A process according to claim 6 wherein the aqueous dispersion includes also about 0.05 to about 0.5 wt. % of antioxidant.

8. A process according to claim 1 wherein said charge-density is about 2 to about 5.2 equivalents.

9. A process according to claim 1 wherein said charge-density is about 3.5 to about 5 equivalents.

10. In a process for forming a highly filled, fibrous-reinforced sheet comprising at least about 50 wt. % filler, in which the sheet is formed from an aqueous dispersion of solids, including fibers, filler, and binder and cationic flocculating agent by continuously feeding a stream of such aqueous dispersion onto a moving porous support surface, wherein the filler comprises at least about 50 wt. % of the solids content of the dispersion, the improvement comprising the use in the aqueous dispersion of: (a) a filler consisting essentially of ground limestone rock; (b) a cationic polymeric flocculant having a charge-density of at least about 2 equivalents of cationic nitrogen per kilogram of polymer; and (c) said binder comprising an anionic polymer binder.

11. A process according to claim 10 wherein the solids content of the aqueous dispersion comprises about 1 to about 10 wt. % of additional water-insoluble filler including one or more of clay, magnesium hydroxide, magnesium carbonate, titanium dioxide, zinc oxide, barium sulfate, calcium sulfate, amorphous silica, aluminum silicate, magnesium silicate, diatomaceous earth, aluminum trihydrate, talc and vermiculite.

12. In a process for forming a highly filled, fibrous-reinforced white sheet which tends to lack opacity, in which the sheet is formed from an aqueous dispersion of solids, including fibers, filler, and binder and cationic flocculating agent by continuously feeding a stream of such aqueous dispersion onto a moving porous support surface, wherein the filler comprises at least about 50 wt. % of the solids content of the dispersion, the improvement comprising forming a highly filled, fibrous-reinforced white sheet comprising at least about 50 wt. % calcium carbonate filler by the use in the aqueous dispersion of: (a) a sufficient amount of carbon black to impart opacity to the white sheet and to retain the white appearance of the sheet; (b) a filler comprising at least about 50 wt. % calcium carbonate; (c) a cationic polymeric flocculant having a charge-density of at least about 2 equivalents of cationic nitrogen per kilogram of polymer; and (d) an anionic resin binder.

13. A process according to claim 12 wherein the solids content of the aqueous dispersion comprises about 1 to about 10 wt. % of additional water-insoluble filler including one or more of clay, magnesium hydroxide, magnesium carbonate, titanium dioxide, zinc oxide, barium sulfate, calcium sulfate, amorphous silica, aluminum silicate, magnesium silicate, diatomaceous earth, aluminum trihydrate, talc and vermiculite.

14. A process according to claim 12 wherein the filler comprises ground limestone rock.

15. A process according to claim 12 wherein the solids content of the dispersion includes about 0.0001 to about 0.05 wt. % of carbon black.

16. A process according to claim 12 wherein the solids content of the dispersion includes about 0.001 to about 0.01 wt. % of carbon black.

17. A process according to claim 1 wherein the charge-density is at least about 3.5 equivalents.

18. A process according to claim 1 wherein the flocculant is a cationic polymer prepared by polymerizing a quaternary ammonium salt of 2-(meth)acryloyloxyethyl-N,N-dimethylamine with acrylamide.

19. A process according to claim 1 wherein the fibers include cellulosic fibers and glass fibers.

20. A process according to claim 1 wherein the solids content of the aqueous dispersion comprises about 1 to about 10 wt. % of additional water-insoluble filler including one or more of clay, magnesium hydroxide, magnesium carbonate, titanium dioxide, zinc oxide, barium sulfate, calcium sulfate, amorphous silica, aluminum silicate, magnesium silicate, diatomaceous earth, aluminum trihydrate, talc and vermiculite.

21. A process according to claim 10 wherein the fibers include cellulosic fibers and glass fibers.

22. A process according to claim 12 wherein the fibers include cellulosic fibers and glass fibers.

23. A process according to claim 1 wherein the anionic binder comprises a carboxylated styrene-butadiene latex.

24. A process according to claim 10 wherein the anionic binder comprises a carboxylated styrene-butadiene latex.

25. A process according to claim 12 wherein the anionic binder comprises a carboxylated styrene-butadiene latex.

26. A process according to claim 10 wherein the charge-density is at least about 3.5 equivalents.

27. A process according to claim 12 wherein the charge-density is at least about 3.5 equivalents.

28. A process according to claim 10 wherein said sheet comprises at least about 70 wt. % filler.

29. A process according to claim 28 wherein said sheet comprises about 75 to about 85 wt. % filler.

30. A process according to claim 12 wherein said sheet comprises at least about 70 wt. % calcium carbonate filler.

31. A process according to claim 30 wherein said sheet comprises about 75 to about 85 wt. % calcium carbonate filler.

* * * * *